UNITED STATES PATENT OFFICE.

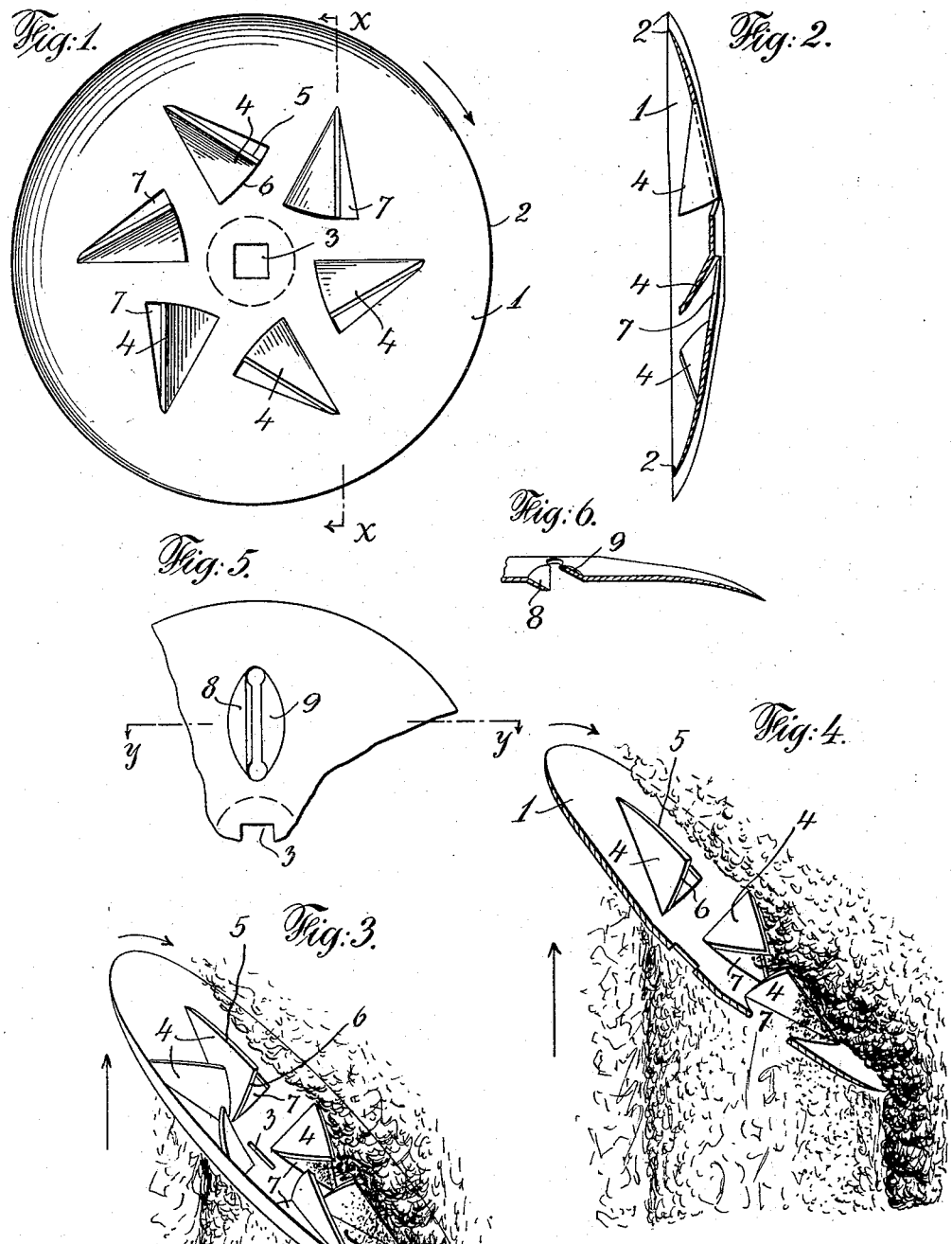

FERDINAND E. CANDA, OF NEW YORK, N. Y.

PLOW AND CULTIVATOR DISK.

1,186,880. Specification of Letters Patent. Patented June 13, 1916.

Application filed April 13, 1914. Serial No. 831,566.

*To all whom it may concern:*

Be it known that I, FERDINAND E. CANDA, a citizen of the United States of America, and a resident of New York, in the county of New York and State of New York, have invented a certain new and useful Plow and Cultivator Disk, of which the following is a specification.

My invention relates to improvements in rotary plow disks, cultivator disks, harrow disks, and the like, and comprises a disk for use in rotary plows, cultivators, harrows and the like, having certain projections, preferably provided with cutting edges, and certain openings, all as hereinafter described, whereby the ground is broken up more effectively than by former disks and whereby a large portion of the ground turned by the disk is caused to pass through such openings in a well-broken condition and is distributed in the rear of the disk whereby the work heretofore performed successively by a plow, a harrow, and a cultivator is, to a large extent, done by the plow disk itself.

My invention consists in the novel construction of rotary disks for plows, cultivators, harrows, etc., hereinafter described and particularly pointed out in the appended claims.

The objects of my invention are to make the disks of rotary plows, cultivators, harrows, etc., more efficient in action; to cause such disks not merely to turn a furrow, but also to break up the ground thoroughly, and to distribute the ground in a finely broken condition, in rear of the disk; to cause such disks to pass through the ground with less resistance; and to accomplish the above objects by a relatively simple and inexpensive construction.

I will now proceed to describe my invention with reference to the accompanying drawings, and will then point out the novel features in claims.

In the drawings: Figure 1 shows a front elevation of a disk embodying my invention. Fig. 2 shows a transverse section of such disk on the line $x$—$x$ of Fig. 1. Fig. 3 shows a top view of the disk in one of the various positions which such disk will assume in action; the disk being in a position oblique to the direction of progress and also inclined with respect to the vertical; so that such disk is seen in perspective. Fig. 4 shows a transverse section of the disk on the line $x$—$x$ of Fig. 1, the disk being in a position such as shown in Fig. 3, and the action of the disk in its progress through the ground being illustrated. Fig. 5 shows a fragmentary elevation of a portion of a disk embodying an alternative construction; and Fig. 6 shows a fragmentary transverse section of such disk on the line $y$—$y$ of Fig. 5.

Referring first to Figs. 1–4 inclusive. Numeral 1 designates the disk itself, which, as is commonly the case, is a dished metallic disk having a sharp cutting edge 2 at its periphery and having the usual central aperture 3 for attachment to a supporting axle. The construction of the plows, cultivators, harrows, etc., in which such disks are used, is well known, and therefore I have not thought it necessary to illustrate the complete plow, harrow, or cultivator, but merely to illustrate the disk itself. At suitable points intermediate its center and its periphery, tongues 4 are pressed inward on the concave side of the disk, such tongues being left in an oblique position and having cutting edges 5 and 6. In the construction shown, these tongues 4 are approximately triangular but I do not limit myself to any particular shape of these tongues. In the construction shown, since these tongues 4 are approximately triangular, the openings 7 formed in the disks by the pressing in of such tongues, are also approximately triangular.

As is well known, rotary plow disks, in action, turn a furrow in much the same manner as a stationary plow share; but since these disks rotate, and also cut at their sharp peripheral edges, they advance through the ground with less resistance than that offered by an equivalent stationary plow share. The ordinary imperforate plow disk merely turns a furrow, with some incidental breaking up of the clods; whereas my improved disk not only cuts up the clods by the action of the cutting edges of the tongues 4, but also causes a large proportion of the earth turned to pass through the openings 7. The earth, in so passing through these openings 7, is further broken and is distributed, in rear of the disk, in a finely broken condition so that, in many cases, it will be unnecessary to harrow the ground preparatory to seeding.

In the alternative construction, illustrated in Figs. 5 and 6, the disk is provided with tongues 8 and 9, arranged in pairs, one tongue of each pair projecting to the front and the other to the rear. The action of this disk is substantially the same as that of the disk shown in Figs. 1–4 inclusive, except that the rearwardly projecting tongues act to still further break up the earth passing through the holes, and also help to pass the earth through the openings of the disk, and to distribute the earth so passed through.

What I claim is:

1. A disk for rotary plows, harrows, cultivators, etc., comprising a disk provided on its front face with projecting tongues, forced inward from the body of the material of the disk, and having cutting edges, openings, resulting from such forcing in of the tongues, being provided in the disk and serving for the passage of earth to the rear of said disk.

2. A disk for rotary plows, harrows, cultivators, etc., comprising a disk concave on one side and provided on its concave side with projecting tongues, forced inward from the body of the material of the disk, openings, resulting from such forcing in of the tongues, being provided in the disk and serving for the passage of earth to the rear of said disk.

3. A disk for rotary plows, harrows, cultivators, etc., comprising a disk concave on one side and provided on its concave side with projecting tongues, forced inward from the body of the material of the disk and having cutting edges, openings, resulting from such forcing in of the disks, being provided in the disk and serving for the passage of earth to the rear of said disk.

4. A disk for rotary plows, harrows, cultivators, etc., comprising a disk concave on its front face and convex on its rear face and provided on both front and rear faces with projecting tongues adapted to break up the earth through which the disk passes.

5. A disk for rotary plows, harrows, cultivators, etc., comprising a disk concave on its front face and convex on its rear face and provided with projecting tongues, certain of which project forwardly from the front face of the disk and others project rearwardly from the rear face of the disk, such tongues adapted to break up the earth through which the disk passes.

6. A disk for rotary plows, harrows, cultivators, etc., comprising a disk provided with projecting tongues arranged in pairs from the body of the material of the disk, certain of such tongues projecting forwardly from the front face of the disk, and others rearwardly from the rear face of the disk, openings, resulting from such forcing in or out of the tongues, being provided in the disk and serving for the passage of earth to the rear of said disk.

7. A disk for rotary plows, harrows, cultivators, etc., comprising a disk provided with projecting tongues arranged in pairs and forced alternately forwardly and backwardly from the body of material of the disk, openings, resulting from such forcing in or out of the tongues, being provided in the disk, and serving for the passage of earth to the rear of said disk.

In testimony whereof I have signed this specification in the presence of two subscribing witnesses.

FERDINAND E. CANDA.

Witnesses:
 H. M. MARBLE,
 PAUL H. FRANKE.

Copies of this patent may be obtained for five cents each, by addressing the "Commissioner of Patents. Washington, D. C."